(12) United States Patent
Ogawa (10) Patent No.: US 11,104,594 B2
(45) Date of Patent: Aug. 31, 2021

(54) AMMONIA SOLUTION PRODUCTION DEVICE AND AMMONIA SOLUTION PRODUCTION METHOD

(71) Applicant: KURITA WATER INDUSTRIES LTD., Tokyo (JP)

(72) Inventor: Yuuichi Ogawa, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 61 days.

(21) Appl. No.: 16/484,475

(22) PCT Filed: Mar. 9, 2017

(86) PCT No.: PCT/JP2017/009432
§ 371 (c)(1),
(2) Date: Aug. 8, 2019

(87) PCT Pub. No.: WO2018/146824
PCT Pub. Date: Aug. 16, 2018

(65) Prior Publication Data
US 2019/0367391 A1    Dec. 5, 2019

(30) Foreign Application Priority Data
Feb. 9, 2017    (JP) .............................. JP2017-022518

(51) Int. Cl.
*C02F 1/68* (2006.01)
*C02F 1/42* (2006.01)

(52) U.S. Cl.
CPC ................. *C02F 1/685* (2013.01); *C02F 1/42* (2013.01); *C02F 2001/425* (2013.01)

(58) Field of Classification Search
CPC ....... C02F 1/685; C02F 1/42; C02F 2001/425
See application file for complete search history.

(56) References Cited

U.S. PATENT DOCUMENTS

2007/0221581 A1    9/2007  Kitami et al.
2009/0165829 A1    7/2009  Morita et al.

FOREIGN PATENT DOCUMENTS

JP    2011194402    10/2011
JP    2013255921    12/2013
(Continued)

OTHER PUBLICATIONS

"International Search Report (Form PCT/ISA/210) of PCT/JP2017/009432," dated Apr. 11, 2017, with English translation thereof, pp. 1-4.

(Continued)

*Primary Examiner* — Lessanework Seifu
(74) *Attorney, Agent, or Firm* — JCIPRNET (57) ABSTRACT

An ammonia solution production device produces a dilute ammonia solution by supplying ammonia from an ammonia supply device to ultrapure water supplied from an ultrapure water production device and dissolving the ammonia, and supplies the ammonia solution to a use point. Here, the ultrapure water production device has the ability to supply ultrapure water having a resistance value of 18 MΩ·cm or more, and a metal ion concentration of 1 ng/L or less, particularly 0.1 ng/L or less. Ammonia is added to the ultrapure water from the ammonia supply device to produce the dilute ammonia water. The ammonia solution production device is suitable for the production of dilute ammonia water having an ammonia concentration of 100 mg/L or less. Such an ammonia solution production device is capable of producing an ammonia solution with a stable concentration, and achieves excellent follow-up performance with respect to a change in the concentration.

4 Claims, 4 Drawing Sheets

(56) References Cited

FOREIGN PATENT DOCUMENTS

| | | |
|---|---|---|
| JP | 2016076589 | 5/2016 |
| JP | 2016076590 | 5/2016 |
| TW | 200538401 | 12/2005 |
| TW | 200744763 | 12/2007 |
| WO | 2007105820 | 9/2007 |

OTHER PUBLICATIONS

"Office Action of Taiwan Counterpart Application", dated Aug. 17, 2020, with English translation thereof, p. 1-p. 17.

AMMONIA SOLUTION PRODUCTION DEVICE AND AMMONIA SOLUTION PRODUCTION METHOD

CROSS-REFERENCE TO RELATED APPLICATION

This application is a 371 application of the international PCT application serial no. PCT/JP2017/009432, filed on Mar. 9, 2017, which claims the priority benefit of Japan application no. 2017-022518, filed on Feb. 9, 2017. The entirety of each of the abovementioned patent applications is hereby incorporated by reference herein and made a part of this specification.

TECHNICAL FIELD

The present invention relates to an ammonia solution production device and an ammonia solution production method, and more particularly to an ammonia solution production device and an ammonia solution production method suitable for obtaining a high-purity ammonia solution.

BACKGROUND ART

In semiconductor or liquid crystal production processes, semiconductor wafers or glass substrates are cleaned using ultrapure water from which impurities have been highly removed.

In the cleaning of a semiconductor wafer using such ultrapure water, static electricity is easily generated due to a high specific resistance value of ultrapure water, and may cause electrostatic breakdown of an insulating film and reattachment of fine particles. Therefore, nowadays, by dissolving a small amount of ammonia in ultrapure water, the specific resistance value of the ultrapure water is adjusted to be low, and generation of static electricity is reduced.

A dilute ammonia solution which is obtained by dissolving a small amount of ammonia in the ultrapure water is produced by diluting, for example, about 5% ammonia water with the ultrapure water to a desired concentration, and it is preferable that this dilute ammonia solution contain as little as possible of impurities, particularly cationic metal ions, because the dilute ammonia solution is used for cleaning electronic members such as semiconductors or the like. Hence, it is proposed to make dilute ammonia water with a desired concentration by adding ammonia to ultrapure water, and thereafter treat the dilute ammonia water with an ammonium-ion-form cation exchange resin (Patent Document 1).

PRIOR ART DOCUMENTS

Patent Documents

[Patent Document 1] JP 2016-76589 A

SUMMARY OF THE INVENTION

Problems to be Solved by the Invention

However, in the ammonia solution production device described in Patent Document 1, since the dilute ammonia water is treated with a cation exchange resin, ammonium ions are also adsorbed, whereby interfering with the removal of metal ions and causing a problem of difficulty in sufficiently decreasing the metal ion concentration. This tendency is particularly pronounced when the concentration of ammonia is higher. Moreover, when changing the concentration of the dilute ammonia solution, since the cation exchange resin in a cation exchange device adsorbs ammonium ions or discharges the adsorbed ammonium ions, there is a problem of taking a long time for the dilute ammonia solution to be stable at a desired concentration.

The present invention has been made in view of the above problems, and the present invention provides an ammonia solution production device and an ammonia solution production method which are capable of producing an ammonia solution with a stable concentration, and achieve excellent follow-up performance with respect to a change in concentration.

Means for Solving the Problems

Firstly, the present invention provides an ammonia solution production device that produces an ammonia solution by adding ammonia from an ammonia supply device to raw water and dissolving the ammonia, and supplies the ammonia solution to a use point, wherein ultrapure water having a metal ion concentration of 1 ng/L or less is used as the raw water (Invention 1).

According to such an invention (Invention 1), it is possible to stably produce an ammonia solution containing a smaller amount of metal ions as impurities, and it is possible to exhibit excellent follow-up performance with respect to a change in the ammonium ion concentration caused by the amount of ammonia to be supplied. The reasons are as follows. That is, according to the research of the present inventor, it is found that, after dilute ammonia water is prepared by adding ammonia to ultrapure water, even if this dilute ammonia water is treated with a cation exchange resin, the metal ion concentration cannot be sufficiently decreased. Then, as a result of studying various measures, it is found that decreasing the metal ion concentration in ultrapure water as raw water is more effective than removing metal ions by treating the dilute ammonia water with the cation exchange resin, and also enables excellent follow-up performance with respect to a change in the ammonium ion concentration. More specifically, it is found that if ultrapure water having a metal ion concentration of 1 ng/L or less is used, it is possible to sufficiently exhibit these effects as a dilute ammonia solution for cleaning semiconductors. The present invention is conceived based on these findings.

In the above invention (Invention 1), it is preferable that a separation distance of an inflow point of the raw water and an addition point of the ammonia by the ammonia supply device is 5 m or less (Invention 2).

According to such an invention (Invention 2), since ammonia is rapidly added to the ultrapure water from which cations have been highly removed, it is possible to prevent dissolution of impurities in the process of conveying the ultrapure water and to obtain a dilute ammonia solution corresponding to the concentration of ammonia to be added.

In the above invention (Invention 1, 2), it is preferable that a metal ion concentration in the ammonia solution be 10 ng/L or less (Invention 3).

According to such an invention (Invention 3), since a high-purity ammonia solution is provided, processes using the ammonia solution, such as cleaning of a semiconductor wafer, can be suitably performed.

Secondly, the present invention provides an ammonia solution production method comprising producing an ammonia solution by adding and dissolving ammonia into raw water, and supplying the ammonia solution to a use point, wherein ultrapure water having a metal ion concentration of 1 ng/L or less is used as the raw water (Invention 4).

According to such an invention (Invention 4), by using the ultrapure water having a metal ion concentration of 1 ng/L or less in the ultrapure water as the raw water, it is possible to reduce the influence of an increase of metal ions as impurities caused by the addition of ammonia, and achieve excellent follow-up performance with respect to a change in the concentration of the dilute ammonia solution.

In the above invention (Invention 4), it is preferable that a metal ion concentration in the ammonia solution be 10 ng/L or less (Invention 5).

According to such an invention (Invention 5), since a high-purity ammonia solution is provided, processes using the ammonia solution, such as cleaning of semiconductor wafers, can be suitably performed.

Effects of the Invention

According to the ammonia solution production device of the present invention, ultrapure water having a metal ion concentration of 1 ng/L or less in the ultrapure water is used as raw water and ammonia is added to this ultrapure water, and thus it is possible to stably produce an ammonia solution containing a smaller amount of metal ions as impurities, and it is possible to exhibit excellent follow-up performance with respect to a change in the ammonium ion concentration caused by the amount of ammonia to be supplied.

EMBODIMENTS FOR CARRYING OUT THE INVENTION

First, an ammonia solution production device according to a first embodiment of the present invention will be described.

In the present embodiment, a dilute ammonia solution is produced by supplying ammonia from an ammonia supply device to ultrapure water supplied from an ultrapure water production device and dissolving the ammonia, and the ammonia solution is supplied to a use point.

Here, the ultrapure water production device has the ability to supply ultrapure water W having a resistance value of 18 MΩ·cm or more, and a metal ion concentration of 1 ng/L or less, particularly 0.1 ng/L or less. If the metal ion concentration exceeds 1 ng/L, the metal ion concentration in the resulting dilute ammonia solution cannot be made sufficiently low, and the follow-up performance with respect to a change in the ammonium ion concentration in the dilute ammonia solution is also not sufficient. It is particularly preferable to use ultrapure water having a metal ion concentration of 0.1 ng/L or less.

Specifically, suitable ultrapure water satisfies resistivity: 18.1 MΩ·cm or more, microparticles of 50 nm or larger in size: 1000 particles/L or less, the number of live bacteria: one bacterium/L or less, TOC (total organic carbon): 1 μg/L or less, total silicon: 0.1 μg/L or less, metals: 0.1 ng/L or less, ions: 10 ng/L or less, hydrogen peroxide: 30 μg/L or less, and water temperature: 25±2° C.

The ammonia supply device is for generating a dilute ammonia solution by adding ammonia to ultrapure water. Here, as the ammonia to be added, gaseous ammonia may be used, but it is preferable to add ammonia water of a predetermined concentration, and it is preferable to use ammonia water having special grade purity or higher purity according to the Japanese Industrial Standards. The ammonia water can be added using a method in which the aqueous solution stored in a tank is added with the use of a reciprocating-type metering pump or a syringe pump, or using pressure feeding means for pressure-feeding the aqueous solution by introducing a pressurized inert gas into the tank.

It is preferable that the addition position of ammonia by the ammonia supply device is at 5 m or less from an outlet of the ultrapure water production device (an inflow point of raw water). Accordingly, by arranging the separation distance from the outlet of the ultrapure water production device to be 5 m or less, it is possible to reduce mixing of ions in the process of conveying the treated water from a cation exchange device 2 or the like and to add the ammonia to the high-purity ultrapure water.

Next, an ammonia solution production method using the ammonia solution production device of the present embodiment having the configuration as described above will be described.

First, ammonia is added from the ammonia supply device to ultrapure water W as raw water. Here, in the present embodiment, since the ultrapure water has a metal ion concentration of 1 ng/L or less, the addition amount of ammonia is rapidly reflected in the ammonium ion concentration, and a dilute ammonia solution of a desired concentration can be stably produced. Moreover, since the metal ion concentration is 1 ng/L or less, there is exhibited an effect of excellent follow-up performance with respect to a change in the ammonium ion concentration caused by a change in the addition amount of ammonia. In short, by changing the addition amount of ammonia to change the concentration of the dilute ammonia solution, it is possible to rapidly change the dilute ammonia solution to a desired concentration. In particular, it is preferable to decrease the metal ion concentration of ultrapure water to an extremely low level of 0.1 ng/L or less because the influence of metal ions contained in the ammonia water to be added can be reduced.

Furthermore, the concentration of the ammonia solution can be roughly grasped from the amount of ammonia added by the ammonia supply device. Hence, in order to stably supply the ammonia solution of desired water quality to the use point, it is preferable to continuously monitor the concentration of the ammonia solution. Such an ammonia solution production method of the present embodiment is suitable for the production of dilute ammonia water having an ammonia (ammonium ion) concentration of 100 mg/L or less, particularly 50 mg/L or less. In the ammonia solution production device of the present embodiment as described above, it is not necessary to provide a cation exchange device after the addition of ammonia, thereby exhibiting an effect of simplifying the device.

Figure 1:
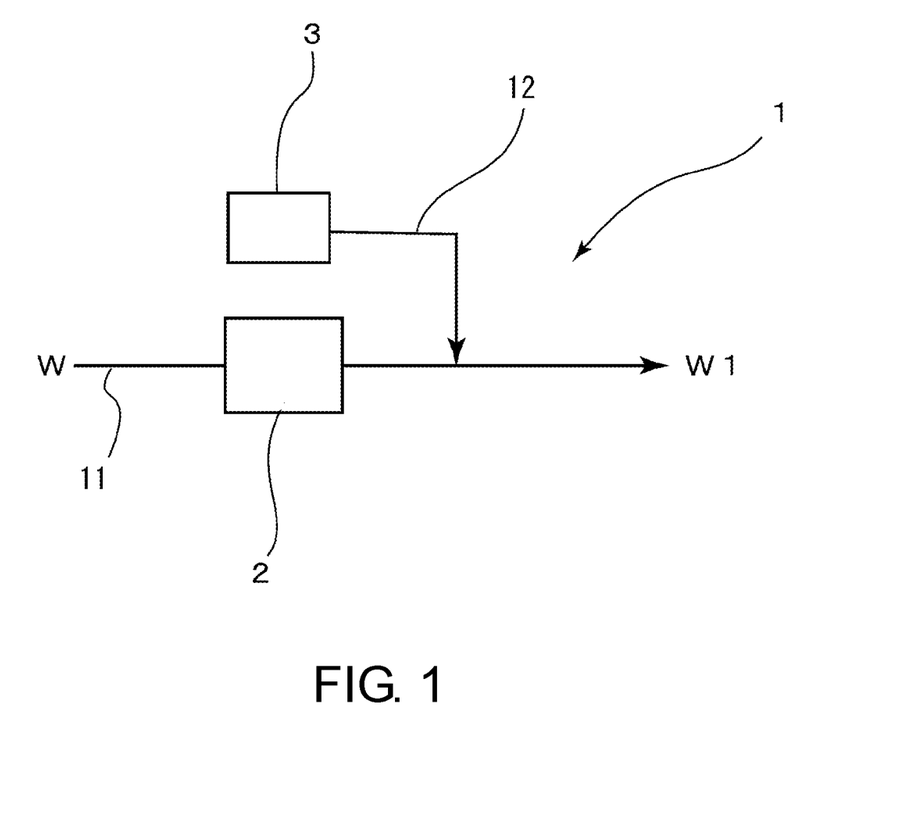
FIG. 1 is a flow chart showing an ammonia solution production device of a second embodiment of the present invention.

Next, an ammonia solution production device according to a second embodiment of the present invention will be described based on FIG. 1. In FIG. 1, an ammonia solution production device 1 has a cation exchange device 2 mounted on the way of a main pipe 11 supplying ultrapure water W as raw water, a supply pipe 12 joining the main pipe 11 on the downstream side of the cation exchange device 2, and an ammonia supply device 3 communicating with the supply pipe 12. It should be noted that although not shown in FIG. 1, various filters and valves may be appropriately provided, if necessary, in the ammonia solution production device 1.

Since the ammonia solution production device 1 as described above dissolves ammonia, that is, ammonium ions ($NH_4^+$) in the present embodiment, it is necessary to remove metal ions as impurities, and therefore the cation exchange device 2 is used. The cation exchange device 2 is filled with a cation exchange resin as a cation exchanger. The form of ion of this cation exchange resin is not particularly limited, but is preferably H form or ammonium ion form because if the ion is in salt form such as Na form, salts such as Na are contained in the ammonia solution, whereby a semiconductor wafer may be contaminated.

The ammonia supply device 3 is for generating an ammonia solution by adding ammonia to the ultrapure water treated by the cation exchange device 2 (hereinafter referred to as the treated water), and the method is not particularly limited as long as the ammonia supply device 3 can add ammonia to the treated water. For example, in the case where gaseous ammonia is added and dissolved into the treated water, it is possible to use a method in which ammonia is dissolved using a gas permeable membrane made of hollow fibers, a method using direct bubbling into the pipe, or the like. In the case where an aqueous solution, which is prepared by dissolving ammonia at a high concentration in pure water or ultrapure water, is added to the treated water and diluted, it is possible to use a method in which the aqueous solution stored in a tank is added using a reciprocating-type metering pump or a syringe pump, or use pressure feeding means for pressure-feeding the aqueous solution by introducing a pressurized inert gas into the tank.

The addition point of ammonia by the ammonia supply device is preferably at 5 m or less from an outlet of the cation exchange device 2. Accordingly, by arranging the separation distance from the outlet of the cation exchange device 2 to be 5 m or less, it is possible to reduce mixing of ions in the process of conveying the treated water from the cation exchange device 2 or the like and to add ammonia to the high-purity treated water.

Next, an ammonia solution production method using the ammonia solution production device 1 of the present embodiment having the configuration as described above will be described.

First, ultrapure water W produced by the ultrapure water production device (not shown) is supplied as raw water from the main pipe 11 and brought into contact with the ion exchange resin in the cation exchange device 2. The ultrapure water W used here has a specific resistance value of 18 MΩ·cm or more, and a metal ion concentration of 10 ng/L or less and more than 1 ng/L. The cation component is removed from the ultrapure water W by the cation exchange device 2. Accordingly, the metal ion concentration in the treated water of the cation exchange device is made 1 ng/L or less, and preferably 0.1 ng/L or less. Ammonia just needs to be added to the ultrapure water W treated by the cation exchange device 2 (hereinafter referred to as the treated water) from the ammonia supply device 3 through the supply pipe 12.

In the case where the metal ion concentration in the ultrapure water W exceeds 1 ng/L as in the present embodiment, the cation exchange device 2 may be mounted on the way of the main pipe 11 to make the metal ion concentration 1 ng/L or less. In this case, a sensor for measuring metal ions may be provided on the outlet side of the cation exchange device 2 to monitor the metal ion concentration in the treated water.

Although the ammonia solution production device and the ammonia solution production method of the present invention have been described above based on the above embodiments, the present invention is not limited to the above embodiments, and various modifications can be made. For example, it is possible to provide a preliminary dilution storage tank communicating with the ammonia supply device, and to supply ammonia and ultrapure water to the preliminary dilution storage tank for preliminary dilution and then perform dilution again with ultrapure water. In addition, the ammonia supply device and the preliminary dilution storage tank may be provided with a purge function of an inert gas such as nitrogen gas. Furthermore, the ammonia supply device and the preliminary dilution storage tank may be provided with an ammonia concentration sensor, and also a concentration sensor may be provided at a stage later than the ammonia supply point to control the addition amount of ammonia.

EXAMPLES

The present invention will be more specifically described by presenting Examples and Comparative Examples below. However, the present invention is not limited in any way by these descriptions.

Example 1

Figure 2:
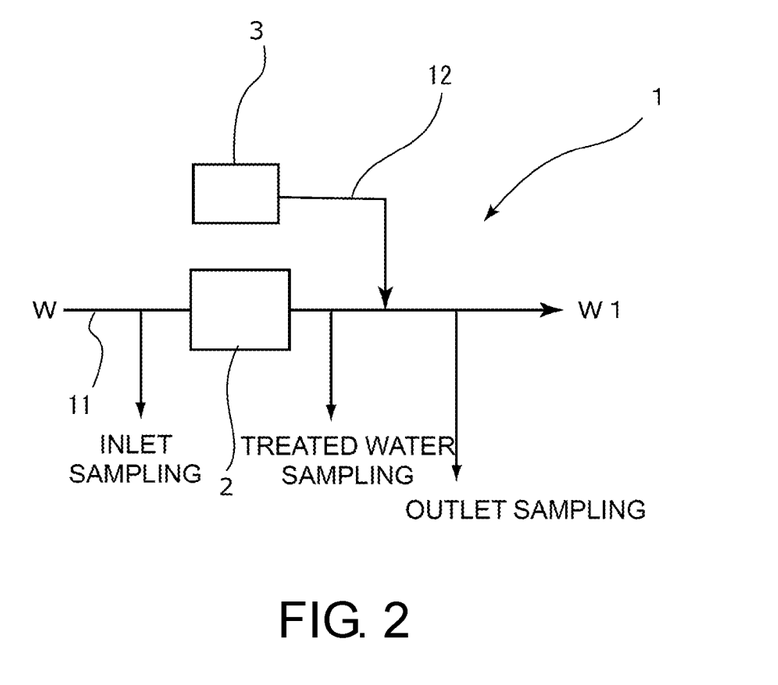
FIG. 2 is a flow chart showing an ammonia solution production device of Examples 1 to 3.

Using the ammonia solution production device 1 shown in FIG. 2, dilute ammonia water was produced as the ammonia solution W1. Here, the ammonia solution production device 1 shown in FIG. 2 is the ammonia solution production device shown in FIG. 1, wherein for testing, an inlet sampling point and a treated water sampling point are provided upstream and downstream of the cation exchange device 2, and an outlet sampling point is provided downstream of an ammonia water addition point of the ammonia supply device 3.

In such an ammonia solution production device, after ultrapure water W having a metal ion concentration of 10 ng/L was treated by the cation exchange device 2, initial setting was made so that the ammonia concentration was 35 mg/L, and ammonia was introduced from the ammonia supply device 3 to produce an initial ammonia solution. When the concentration of the initial ammonia water became stable, the initial ammonia solution was sampled at the outlet sampling point, and the ammonia concentration and the metal ion concentration were measured. As a result, the ammonia concentration was 35 mg/L, and the metal ion concentration was 10 ng/L.

Thereafter, the setting was changed so that the ammonia concentration was 10 mg/L and accordingly the amount of ammonia introduced from the ammonia supply device 3 was changed, and the dilute ammonia water W1 was produced. One minute after the setting change, the outlet water was sampled, and the ammonia concentration and the metal ion concentration were measured. The ammonia concentration was 10 mg/L, and the metal ion concentration was less than 0.1 ng/L. These results are shown in Table 1 together with the metal ion concentration in the inlet water (ultrapure water W) and that in the treated water of the cation exchange device 2.

Example 2

The dilute ammonia water W1 was produced in the same manner as in Example 1, except that the setting was changed so that the ammonia concentration was 0.1 mg/L, and accordingly the amount of ammonia introduced from the ammonia supply device 3 was changed. Then, one minute after the setting change, the ammonia solution was collected at the outlet sampling point, and the ammonia concentration and the metal ion concentration were measured. The ammonia concentration was 0.1 mg/L, and the metal ion concentration was less than 0.1 ng/L. These results are shown in Table 1 together with the metal ion concentration in the inlet water (ultrapure water W) and that in the treated water of the cation exchange device 2.

Example 3

In Example 1, after treating the ultrapure water W having a metal ion concentration of 10 ng/L as raw water by the cation exchange device 2, the initial setting was made so that the ammonia concentration was 0.1 mg/L, and ammonia was introduced from the ammonia supply device 3 to produce the initial ammonia water. When the concentration of the initial ammonia water became stable, the initial ammonia solution was sampled at the outlet sampling point, and the ammonia concentration and the metal ion concentration were measured. As a result, the ammonia concentration was 0.1 mg/L, and the metal ion concentration was less than 0.1 ng/L.

Thereafter, the setting was changed so that the ammonia concentration was 35 mg/L and accordingly the amount of ammonia introduced from the ammonia supply device 3 was changed, and the dilute ammonia water W1 was produced. One minute after the setting change, the ammonia solution was collected at the outlet sampling point, and the ammonia concentration and the metal ion concentration were measured. The ammonia concentration was 35 mg/L, and the metal ion concentration was less than 0.1 ng/L. These results are shown in Table 1 together with the metal ion concentration in the treated water of the cation exchange device 2.

Example 4

Figure 3:
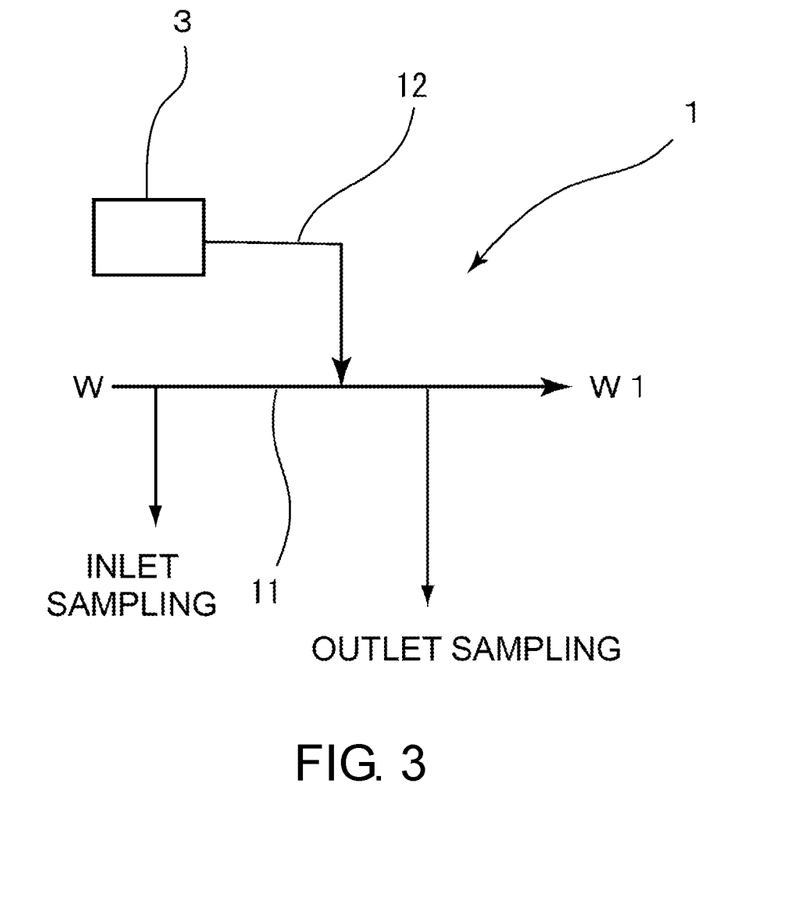
FIG. 3 is a flow chart showing an ammonia solution production device of Examples 4 to 6.

Dilute ammonia water W1 was produced using the ammonia solution production device 1 shown in FIG. 3. Here, the ammonia solution production device 1 shown in FIG. 3 is configured to supply the ammonia water from the ammonia supply device 3 to the ultrapure water W, and further, for testing, an inlet sampling point is provided upstream of an addition point of ammonia, and an outlet sampling point is provided downstream of the addition point of ammonia.

In such an ammonia solution production device, initial setting was made so that the ammonia concentration was 35 mg/L, and ammonia was introduced from the ammonia supply device 3 into the ultrapure water W having a metal ion concentration of less than 0.1 ng/L to produce the initial ammonia water. When the concentration of the initial ammonia water became stable, the initial ammonia solution was sampled at the outlet sampling point, and the ammonia concentration and the metal ion concentration were measured. As a result, the ammonia concentration was 35 mg/L, and the metal ion concentration was less than 0.1 ng/L.

Thereafter, the setting was changed so that the ammonia concentration was 10 mg/L and accordingly the amount of the ammonia solution introduced from the ammonia supply device 3 was changed, and the dilute ammonia water W1 was produced. One minute after the setting change, the ammonia solution was collected at the outlet sampling point, and the ammonia concentration and the metal ion concentration were measured. The ammonia concentration was 10 mg/L, and the metal ion concentration was less than 0.1 ng/L. These results are shown in Table 1 together with the metal ion concentration in the inlet water (ultrapure water W) and that in the treated water of the cation exchange device 2.

Example 5

The dilute ammonia water W1 was produced in the same manner as in Example 4, except that the setting was changed so that the ammonia concentration was 0.1 mg/L, and the amount of the ammonia solution introduced from the ammonia supply device 3 was changed. Then, one minute after the setting change, the ammonia solution was collected at the outlet sampling point, and the ammonia concentration and the metal ion concentration were measured. The ammonia concentration was 0.1 mg/L, and the metal ion concentration was less than 0.1 ng/L. These results are shown in Table 1 together with the metal ion concentration in the inlet water (ultrapure water W) and that in the treated water of the cation exchange device 2.

Example 6

In Example 4, initial setting was made so that the ammonia concentration was 0.1 mg/L, and ammonia was introduced from the ammonia supply device 3 into the ultrapure water W having a metal ion concentration of less than 0.1 ng/L to produce the initial ammonia water. When the concentration of the initial ammonia water became stable, the initial ammonia solution was sampled at the outlet sampling point, and the ammonia concentration and the metal ion concentration were measured. As a result, the ammonia concentration was 0.1 mg/L, and the metal ion concentration was less than 0.1 ng/L.

Thereafter, the setting was changed so that the ammonia concentration was 35 mg/L and accordingly the amount of the ammonia solution introduced from the ammonia supply device 3 was changed, and the dilute ammonia water W1 was produced. One minute after the setting change, the ammonia solution was collected at the outlet sampling point, and the ammonia concentration and the metal ion concentration were measured. The ammonia concentration was 35 mg/L, and the metal ion concentration was less than 0.1 ng/L. These results are shown in Table 1 together with the metal ion concentration in the inlet water (ultrapure water W) and that in the treated water of the cation exchange device 2.

Comparative Example 1

Figure 4:
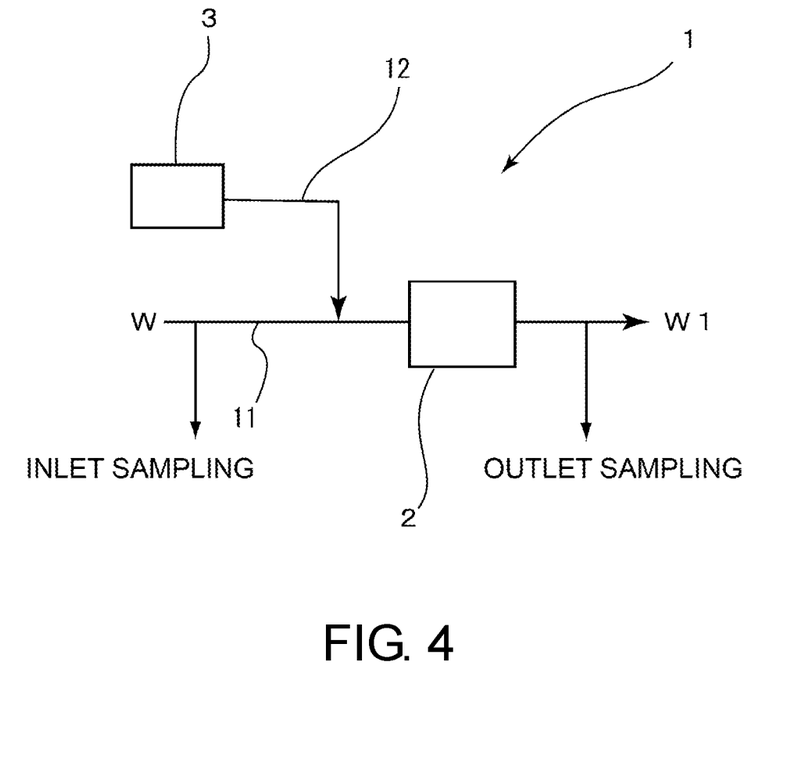
FIG. 4 is a flow chart showing an ammonia solution production device of Comparative Examples 1 to 5.

The dilute ammonia water W1 as produced using the ammonia solution production device 1 shown in FIG. 4. The ammonia solution production device 1 shown in FIG. 4 is configured to supply ammonia water from the ammonia supply device 3 to the ultrapure water W and thereafter treat the water by the cation exchange device 2 filled with a cation exchange resin, and further, for testing, an inlet sampling point is provided upstream of the ammonia addition point, and an outlet sampling point is provided downstream of the cation exchange device 2.

In such an ammonia solution production device, initial setting was made so that the ammonia concentration was 35 mg/L, and ammonia was introduced from the ammonia supply device 3 into the ultrapure water W having a metal ion concentration of 10 ng/L, and thereafter the water was treated by the cation exchange device 2 to produce the initial ammonia water. When the concentration of the initial ammonia water became stable, the initial ammonia solution was sampled at the outlet sampling point, and the ammonia concentration and the metal ion concentration were measured. As a result, the ammonia concentration was 35 mg/L, and the metal ion concentration was 10 ng/L.

Thereafter, the setting was changed so that the ammonia concentration was 10 mg/L and accordingly the amount of ammonia introduced from the ammonia supply device 3 was changed, and the dilute ammonia water W1 was produced. One minute after the setting change, the outlet water was sampled, and the ammonia concentration and the metal ion concentration were measured. The ammonia concentration was 15 mg/L, and the metal ion concentration was 3 ng/L. These results are shown in Table 1 together with the metal ion concentration in the inlet water (ultrapure water W).

Comparative Example 2

The dilute ammonia water W1 was produced in the same manner as in Comparative Example 1, except that the setting was changed so that the ammonia concentration was 25 mg/L, and the amount of the ammonia solution introduced from the ammonia supply device 3 was changed. One minute after the setting change, the outlet water was sampled, and the ammonia concentration and the metal ion concentration were measured. The ammonia concentration was 29 mg/L, and the metal ion concentration was less than 4 ng/L. These results are shown in Table 1 together with the metal ion concentration in the inlet water (ultrapure water W).

Comparative Example 3

The dilute ammonia water W1 was produced in the same manner as in Comparative Example 1, except that the setting was changed so that the ammonia concentration was 0.1 mg/L, and the amount of the ammonia solution introduced from the ammonia supply device 3 was changed. One minute after the setting change, the outlet water was sampled, and the ammonia concentration and the metal ion concentration were measured. The ammonia concentration was 10 mg/L, and the metal ion concentration was less than 2 ng/L. These results are shown in Table 1 together with the metal ion concentration in the inlet water (ultrapure water W).

Comparative Example 4

In Comparative Example 1, initial setting was made so that the ammonia concentration was 0.1 mg/L, and ammonia was introduced from the ammonia supply device 3 into the ultrapure water W having a metal ion concentration of 10 ng/L, and thereafter the water was treated by the cation exchange device 2 to produce the initial ammonia water. When the concentration of this initial ammonia water became stable, the initial ammonia solution was sampled at the outlet sampling point, and the ammonia concentration and the metal ion concentration were measured. As a result, the ammonia concentration was 0.1 mg/L, and the metal ion concentration was 10 ng/L.

Thereafter, the setting was changed so that the ammonia concentration was 35 mg/L and accordingly the amount of ammonia introduced from the ammonia supply device 3 was changed, and the dilute ammonia water W1 was produced. One minute after the setting change, the outlet water was sampled, and the ammonia concentration and the metal ion concentration were measured. The ammonia concentration was 29 mg/L, and the metal ion concentration was 4 ng/L. These results are shown in Table 1 together with the metal ion concentration in the inlet water (ultrapure water W).

Comparative Example 5

In Comparative Example 1, initial setting was made so that the ammonia concentration was 35 mg/L, and ammonia was introduced from the ammonia supply device 3 into the ultrapure water W having a metal ion concentration of 100 ng/L, and thereafter the water was treated by the cation exchange device 2 to produce the initial ammonia water. When the concentration of the initial ammonia water became stable, the initial ammonia solution was sampled at the outlet sampling point, and the ammonia concentration and the metal ion concentration were measured. As a result, the ammonia concentration was 35 mg/L, and the metal ion concentration was 10 ng/L.

Thereafter, the setting was changed so that the ammonia concentration was 10 mg/L and accordingly the amount of ammonia introduced from the ammonia supply device 3 was changed, and the dilute ammonia water W1 was produced. One minute after the setting change, the outlet water was sampled, and the ammonia concentration and the metal ion concentration were measured. The ammonia concentration was 14 mg/L, and the metal ion concentration was 27 ng/L. These results are shown in Table 1 together with the metal ion concentration in the inlet water (ultrapure water W).

TABLE 1

| | Inlet water | Treated water | Dilute ammonia solution (outlet water) | | | |
| | | | Initial value | Set value | 1 min. after setting | |
| Example No. | Metal ions [ng/L] | Metal ions [ng/L] | Ammonia concentration [mg/L] | Ammonia concentration [mg/L] | Ammonia concentration [mg/L] | Metal ions [ng/L] |
|---|---|---|---|---|---|---|
| Example 1 | 10 | <0.1 | 35 | 10 | 10 | <0.1 |
| Example 2 | 10 | <0.1 | 35 | 0.1 | 0.1 | <0.1 |
| Example 3 | 10 | <0.1 | 0.1 | 35 | 35 | <0.1 |
| Example 4 | <0.1 | — | 35 | 10 | 10 | <0.1 |
| Example 5 | <0.1 | — | 35 | 0.1 | 0.1 | <0.1 |
| Example 6 | <0.1 | — | 0.1 | 35 | 35 | <0.1 |
| Comparative Example 1 | 10 | — | 35 | 10 | 15 | 3 |
| Comparative Example 2 | 10 | — | 35 | 25 | 29 | 4 |
| Comparative | 10 | — | 35 | 0.1 | 10 | 2 |

TABLE 1-continued

| Example No. | Inlet water Metal ions [ng/L] | Treated water Metal ions [ng/L] | Dilute ammonia solution (outlet water) | | | |
|---|---|---|---|---|---|---|
| | | | Initial value Ammonia concentration [mg/L] | Set value Ammonia concentration [mg/L] | 1 min. after setting Ammonia concentration [mg/L] | Metal ions [ng/L] |
| Example 3 | | | | | | |
| Comparative Example 4 | 10 | — | 0.1 | 35 | 29 | 4 |
| Comparative Example 5 | 100 | — | 35 | 10 | 14 | 27 |

As is apparent from Table 1, in the ammonia solution production devices of Examples 1 to 6 in which the ultrapure water W having a metal ion concentration of less than 0.1 ng/L was used as raw water and the ammonia water was added to the ultrapure water W, the rate of deviation between the set value of ammonia concentration and the ammonia concentration one minute after the setting change of the ammonia concentration was small, and the metal ion concentration in the resulting dilute ammonia water W1 was also less than 0.1 ng/L. On the other hand, in the ammonia solution production devices of Comparative Examples 1 to 5 in which, after ammonia was added to the ultrapure water W, the water was treated with the cation exchange resin, the follow-up performance of the ammonia concentration one minute after the setting change of the ammonia concentration was poor, and the metal ion concentration in the resulting dilute ammonia water W1 was large due to the influence of the concentration of the ammonia water. From these results, in the ammonia solution production devices of Examples 1 to 6, it is not necessary to mount a cation exchange device after the addition of ammonia, and particularly Examples 4 to 6 exhibit an effect of significantly simplifying the device.

DESCRIPTION OF REFERENCE SYMBOLS

1 Ammonia solution production device
2 Cation exchange device
3 Ammonia supply device
W Ultrapure water (raw water)
W1 Ammonia solution (dilute ammonia water)

The invention claimed is:

1. An ammonia solution production device that produces an ammonia solution having a metal ion concentration of 10 ng/L or less, and supplies the ammonia solution to a use point, comprising:
   a cation exchange device mounted on a way of a main pipe supplying ultrapure water, wherein the cation exchange device is configured to produce the ultrapure water by removing a cation component from a raw water;
   a supply pipe joining the main pipe on a downstream side of the cation exchange device; and
   an ammonia supply device communicating with the supply pipe, wherein the ammonia supply device is configured to add and dissolve ammonia into the ultrapure water,
   wherein the ultrapure water has a metal ion concentration of 1 ng/L or less,
   no solute is dissolved in the ultrapure water between an inflow point of the ultrapure water and the addition point of the ammonia by the ammonia supply device, wherein the inflow point of the ultrapure water is an outlet of the cation exchange device, and
   no ion is removed before the produced ammonia solution is supplied to the use point.

2. The ammonia solution production device according to claim 1, wherein a separation distance between the inflow point of the ultrapure water and the addition point of the ammonia by the ammonia supply device is 5 m or less.

3. An ammonia solution production method comprising: producing an ammonia solution by adding and dissolving ammonia into ultrapure water; and supplying the ammonia solution to a use point,
   wherein the ultrapure water is produced by removing a cation component from a raw water, and has a metal ion concentration of 1 ng/L or less,
   no solute is dissolved in the ultrapure water after the ultrapure water is produced and before the ammonia is added and dissolved into the ultrapure water, and
   no ion is removed before the produced ammonia solution is supplied to the use point.

4. The ammonia solution production method according to claim 3, wherein a metal ion concentration in the ammonia solution is 10 ng/L or less.

* * * * *